(12) United States Patent
Stirner

(10) Patent No.: US 8,360,627 B2
(45) Date of Patent: Jan. 29, 2013

(54) SCREW MACHINE HAVING A VACUUM HOUSING INSERT

(75) Inventor: Thorsten Stirner, Königsbach-Stein (DE)

(73) Assignee: Coperion GmbH, Stuttgart (DE)

( * ) Notice: Subject to any disclaimer, the term of this patent is extended or adjusted under 35 U.S.C. 154(b) by 350 days.

(21) Appl. No.: 12/693,997

(22) Filed: Jan. 26, 2010

(65) Prior Publication Data

US 2010/0202243 A1    Aug. 12, 2010

(30) Foreign Application Priority Data

Feb. 11, 2009   (EP) .................................... 09001867

(51) Int. Cl.
*B29B 7/84*   (2006.01)
*B29C 47/76*  (2006.01)

(52) U.S. Cl. .......................................... 366/75; 425/203
(58) Field of Classification Search .................... 366/75, 366/79, 83–85; 425/203, 204, 208–209; 96/11
See application file for complete search history.

(56) References Cited

U.S. PATENT DOCUMENTS

| | | | | |
|---|---|---|---|---|
| 3,371,379 A | * | 3/1968 | Reifenhauser | 96/196 |
| 3,572,647 A | * | 3/1971 | Staheli | 366/75 |
| 4,130,901 A | * | 12/1978 | Borovikova et al. | 366/75 |
| 4,260,264 A | * | 4/1981 | Maki et al. | 366/75 |
| 4,578,455 A | * | 3/1986 | Pipper et al. | 528/501 |
| 7,607,817 B2 | * | 10/2009 | Samann et al. | 366/75 |
| 2006/0034962 A1 | * | 2/2006 | Guntherberg et al. | 425/208 |
| 2008/0248152 A1 | * | 10/2008 | Samann et al. | 425/208 |
| 2010/0202243 A1 | * | 8/2010 | Stirner | 366/139 |

FOREIGN PATENT DOCUMENTS

| | | |
|---|---|---|
| DE | 195 16 082 A1 | 11/1996 |
| DE | 20 2007 011 767 U1 | 1/2009 |
| EP | 1 400 337 A1 | 3/2004 |
| EP | 1 977 877 A1 | 10/2008 |
| GB | 1 277 150 | 6/1972 |
| JP | 09262830 A * | 10/1997 |
| JP | 2002210805 A * | 7/2002 |
| JP | 2003071831 A * | 3/2003 |
| JP | 2010253804 A * | 11/2010 |
| JP | 2011224862 A * | 11/2011 |

OTHER PUBLICATIONS

European Search Report corresponding to EP Application No. 09001867.2, Jul. 2009.
Plastics Processing Technology News Letter issued by JSW (The Japanese Steel Works, Ltd.); De-Gassing Cylinder; Sep. 18, 2000.
Machine-type English translation of DE 195 16 082 A1, Jan. 2010.
Machine-type English translation of DE 20 2007 011 767 U1, Jan. 2010.
English translation of abstract of EP 1 977 877 A1, Jan. 2010.
English translation of abstract of EP 1 400 337 A1, Jan. 2010.

* cited by examiner

*Primary Examiner* — Charles E Cooley
(74) *Attorney, Agent, or Firm* — James B. Conte; Husch Blackwell LLP

(57) ABSTRACT

A screw machine for treating at least partially powdery bulk material has a housing with at least one housing bore and a screw arranged in the housing bore. A vacuum housing portion is provided, which is formed as a vacuum housing insert, which is releasably attached in the housing, in which a metal nonwoven is exchangeably held as a gas-permeable wall portion on a base body.

11 Claims, 8 Drawing Sheets

SCREW MACHINE HAVING A VACUUM HOUSING INSERT

FIELD OF THE INVENTION

The invention relates to a screw machine for treating at least partially powdery bulk material, with a housing, which has at least one housing bore with an inner wall, with a feed opening for the bulk material arranged at one end of the housing, with a respective screw arranged in the at least one housing bore, with a metering device arranged upstream of the feed opening for feeding the bulk material, with a vacuum housing portion in the intake zone, which has a gas-permeable wall portion delimiting the at least one housing bore, and with a drive for the at least one screw.

BACKGROUND OF THE INVENTION

A screw machine of this type formed as an extruder is known from DE 1 729 395 B (corresponding to GB 1 277 150). A normal sieve or a filter made of sintered material is provided there as a vacuum housing portion in order to bring about a venting of the bulk material to be processed containing a large amount of air. The porous wall portion may be level and arranged at a clear spacing from the bores in the housing. Alternatively, this porous wall portion may be arranged aligned with the bore walls. It has been shown that, in the latter case, the wall of the porous wall portion facing the bore was clogged by partially plasticized plastics material and therefore the desired effect of venting was destroyed. In the first case, the venting is substantially prevented.

A further extruder is known from DE 195 16 082 A1. There, the basic problem is assumed that feeding powdery bulk material into an extruder is difficult. In order to be able to dispense with the use of pre-compacting loading devices, for example stuffing screws, openings are formed in the intake zone or solid material conveying zone with such a large diameter that gas and solid material can and should discharge from them due to applied negative pressure in the range of 0 to 50%. The single purpose of this negative pressure loading is the degassing of the bulk material. This should furthermore avoid a rearward degassing via the feed opening, which also impedes the bulk material feed. Furthermore, a pressure can already be built up in the intake zone.

A further advantage is to be that an increase in the coefficient of friction on the housing takes place in the region of the openings being used for the discharge of gas and material. It is disadvantageous that apart from gas, part of the powdery solid material is also drawn off through the openings. Thus, adequate operating reliability and economy are not ensured. A similarly constructed feed screw machine is known from DE 20 2007 011 767 U1.

An extruder of the generically assumed type, in which a filter is used as the gas-permeable wall portion, through which air, but also large quantities of process gases, such as, for example steam in the case of ABS and wood flour, are to be drawn off, is known from the publication of "The Japan Steel Works, Ltd., Plastics Processing Technology News Letter", De-Gassing Cylinder "DGC". Part of the solid material is also drawn off here through the filter openings. Moreover, the risk also exists of clogging the filter openings by the powdery bulk material.

An extruder similar to the generic screw machine is known from EP 1 977 877 A1 (corresponding to US 2008/0248152 A1), in which the gas-permeable wall portion consisting of sintered metal has an inner wall which delimits at least one bore and is set back in relation to the inner wall of the bore with the formation of a gap with a partially annular cross section, wherein, in addition, the gas-permeable wall portion can be attached by means of a pressure-flushing line to a pressure gas source. It has been shown that the gas permeability also decreases here owing to penetrating bulk material particles. In the extreme case, the gas-permeable wall portion becomes unusable owing to clogging of the pores or microchannels, with it also not being possible to eliminate this effect by a back-flush. There is a high outlay in terms of work and cost for exchanging or repairing a wall portion of this type consisting of sintered metal and being gas-permeable per se. One of the reasons for the clogging is that the filter fineness of sintered metals of this type is not small enough, so bulk material particles penetrate into the sintered metal and clog it.

SUMMARY OF THE INVENTION

The invention is based on the object of improving a possibility for eliminating a clogging of the gas-permeable wall portion.

This object is achieved according to the invention by a screw machine in which the vacuum housing portion is formed as a vacuum housing insert releasably attached in the housing, in which a metal nonwoven is exchangeably held as a gas-permeable wall portion on a base body.

By using a metal nonwoven, a significantly higher filter fineness can be achieved than when using sintered metals. Furthermore, it is possible to exchange a very thin metal nonwoven of this type with relatively few hand movements owing to the measures according to the invention. Because the filter fineness of a metal nonwoven of this type can be very small, bulk material particles do not penetrate therein, in any case they do so to a significantly lesser extent than in sintered metal. As metal nonwovens of this type may be very thin, the pressure loss occurring therein is very low. The term filter fineness and the associated numerical values are used according to ISO16889.

As the metal nonwoven is itself not load-bearing, the measures, in which the metal nonwoven is supported by means of a gas-permeable support body with respect to the base body, in which the support body is formed as a support woven fabric, in which a gas-permeable drainage body is arranged between the support body and the base body, in which the drainage body is formed as a drainage woven fabric, in which the support woven fabric has a mesh width in the range of 100 μm to 400 μm and in which the drainage woven fabric has a mesh width in the range of 500 μm to 1000 μm, are of great advantage alternatively or cumulatively.

Screw machines, in which the base body has at least one partially cylindrical support face adapted to the inner wall of the at least one bore, against which support face the metal nonwoven is supported and in that holding strips are releasably attached to the base body and hold the metal non-woven in a clamping manner on the base body, in which the holding strips have clamping webs, which hold the metal nonwoven in a clamping manner against the base body, in which the base body is provided with edge webs surrounding the at least one support face, between which edge webs at least one of the support body and the drainage body are arranged, in which the holding strips are arranged flush with the inner wall of the at least one bore, in which the metal nonwoven is partially held in a clamping manner between the base body and at least one holding strip and in which the holding strips are formed as a holding frame, reflect, again alternatively or cumulatively, an advantageous configuration of the vacuum housing insert according to the invention, which allows a simple exchange of the metal nonwoven.

The screw machine according to the invention may, on the one hand, be formed as an extruder for preparing bulk material which is at least partially powdery, in other words contains air, but also as a feed screw machine, in which the bulk material is vented and compacted and then fed to the extruder for processing.

Further features, details and advantages of the invention emerge from the following description of an embodiment with the aid of the drawings.

DESCRIPTION OF THE PREFERRED EMBODIMENT

Figure 1:
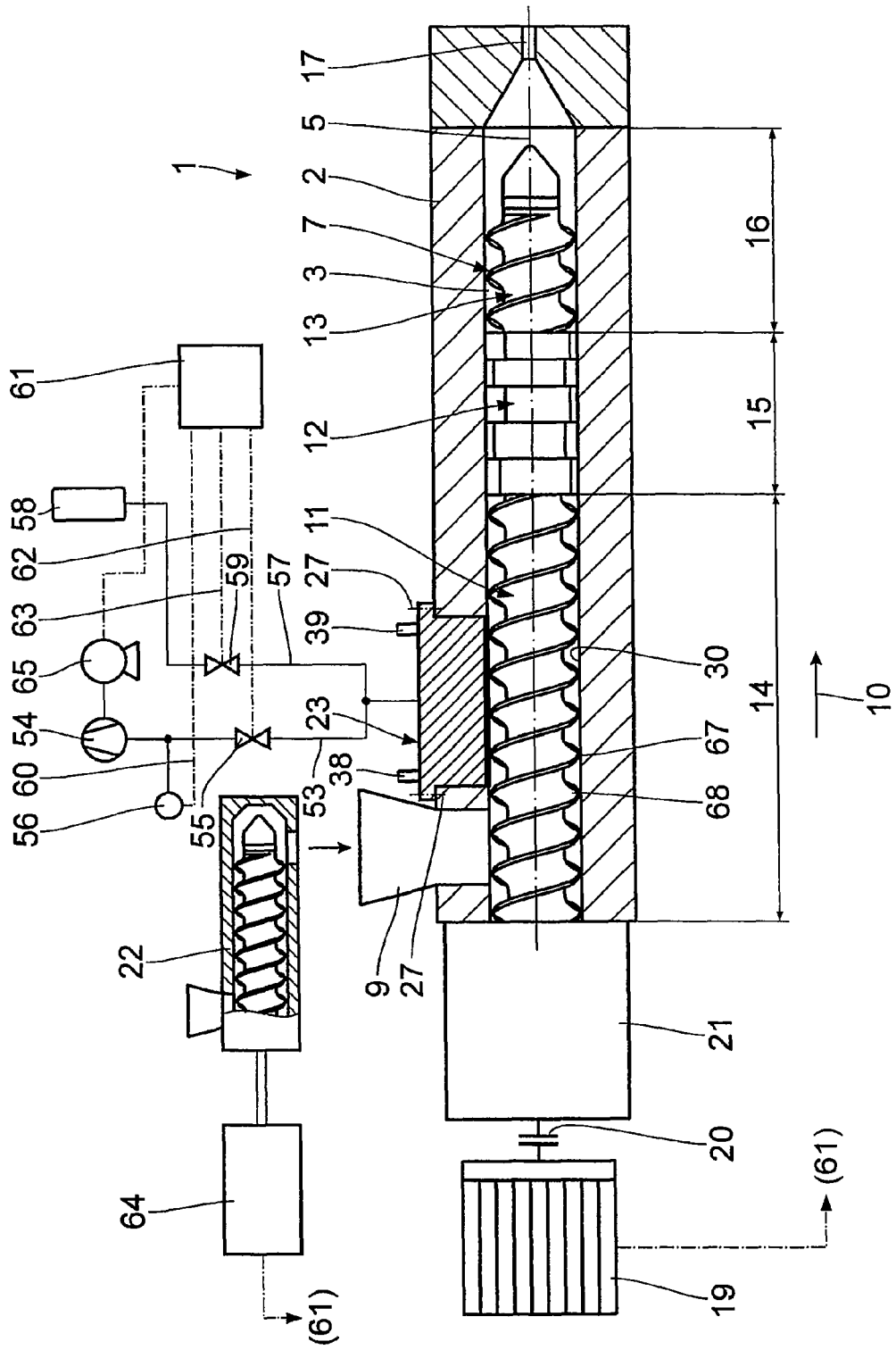
FIG. 1 shows an extruder system with an extruder in a vertical longitudinal section.
Figure 2:
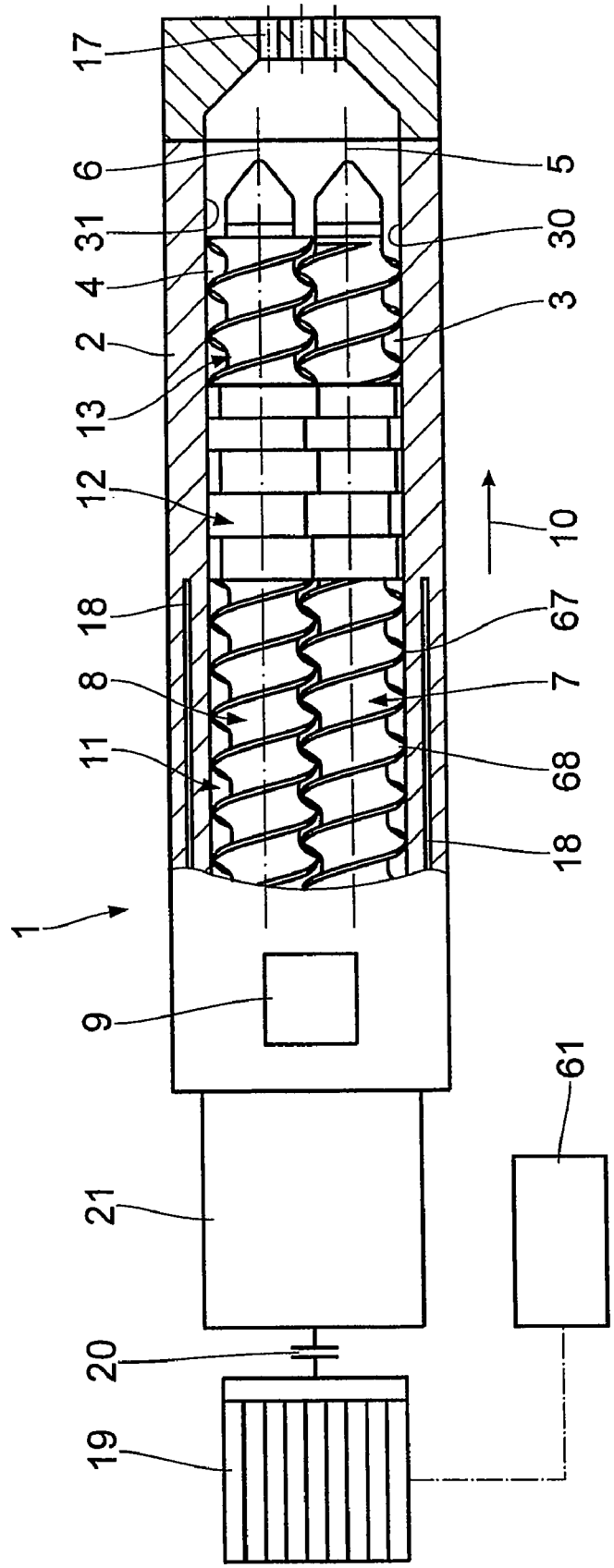
FIG. 2 shows the extruder according to FIG. 1 in a horizontal longitudinal section.

The extruder system shown in FIGS. 1 and 2 has a screw machine formed as an extruder 1. Figure of eight-shaped interconnected housing bores 3, 4, the axes 5, 6 of which extend parallel to one another, are formed in the housing 2 thereof generally consisting of a plurality of housing sections. Arranged in the housing bores 3, 4 are two screws 7, 8. The screws are formed as closely meshing screws 7, 8 rotating in the same direction. A feed funnel 9 opens into the bores 3, 4 at one end, which is on the left in FIGS. 1 and 2. Proceeding from the feed funnel 9, provided in the conveying direction 10 are the screws 7, 8 with a first conveying screw portion 11, adjoining this a kneading disc portion 12 and again a second conveying screw portion 13.

The first conveying screw portion 11 extends over an intake zone 14 acting as a solid material conveying zone. The kneading disc portion 12 defines a melting zone 15 here. The seconding conveying screw portion 13 defines a pressure build-up zone 16. Adjoining the pressure build-up zone 16 at the end of the housing 2 is a discharge nozzle 17. As can also be inferred from the drawing, the housing 2 is provided in a delimited portion of the intake zone 14 with cooling channels 18.

The screws 7, 8 are driven by means of an electric motor 19, which is connected in terms of drive by means of a clutch 20 to a reducing and distributor gearing 21. The screws 7, 8 are in turn coupled in a conventional manner to the gearing 21. A metering device 22, which is formed, for example, as a gravimetric metering screw, is arranged above the feed funnel 9.

At a small spacing, but at a spacing behind the feed funnel 9, the housing 2 has a vacuum housing insert 23, which thus extends over a part portion of the intake zone 14 and is formed in an adapted opening 2a in the housing 2. The vacuum housing insert 23 has a block-shaped base body 24 which is provided on one side with a peripheral flange 25, in which bores 26 are formed for fastening by means of screws 27 to the housing 2. On its side remote from the flange 25, the base body 24 is provided with two approximately partly cylindrical support faces 28, 29, which substantially correspond to the curvature of the inner walls 30, 31 of the bores 3, 4 and form an interstice 32 at their penetration point.

A central vacuum channel 33, which opens by means of a respective branch channel 34, 35 in each support face 28, 29, is formed in the block-shaped base body 24. Vacuum distribution channels 36 in the form of open grooves can also be formed in the support faces 28, 29.

Moreover, adjacent to the support faces 28, 29 in the base body 24, cooling channels 37 are also formed, which are supplied with coolant by means of a coolant feed connection 38 in the flange 25, which coolant is removed again by means of a coolant removal connection 39 in the flange 25.

The support faces 28, 29 are delimited by linear edge webs 40 extending parallel to the axes 5, 6 of the bores 3, 4 and by curved edge webs 41 following the curvature of the support faces 28, 29, the edge webs 40, 41 projecting up by a small amount relative to the support faces 28, 29.

Placed between the edge webs 40, 41 on the support faces 28, 29 is a drainage woven fabric 42 curved in accordance with the doubly curved course of the support faces 28, 29 and having a coarse mesh width, for example a mesh width of 800 µm and a thickness of, for example 1.0 mm. In general it applies that the drainage woven fabric 42 has a mesh width in the range of 500 µm to 1000 µm. A support woven fabric 43 with a finer mesh width of, for example about 300 µm, rests on this drainage woven fabric 42. In general it applies that the support woven fabric 43 has a mesh width in the region of 100 µm to 400 µm. The thickness is, for example in the region of 0.4 mm. A thin metal nonwoven 44 being a thin metal fleece is finally arranged on this support woven fabric 43 and has a very high porosity with filter finenesses according to ISO 16889 of 3 µm to 10 µm. It applies in general that the filter fineness of the metal nonwoven 44 extends from 1 µm to 10 µm. The thickness of the metal nonwoven 44 is in the range of 0.3 mm to 0.5 mm here. A nonwoven is taken to mean a layer of substantially straight, unordered fibers adhering to one another, which are in other words not connected to one another by weaving or knitting.

While the drainage woven fabric 42 and the support woven fabric 43 rest on the support faces 28, 29 between the edge webs 40, 41, the metal non-woven 44 rests on these edge webs 40, 41.

Figure 3:
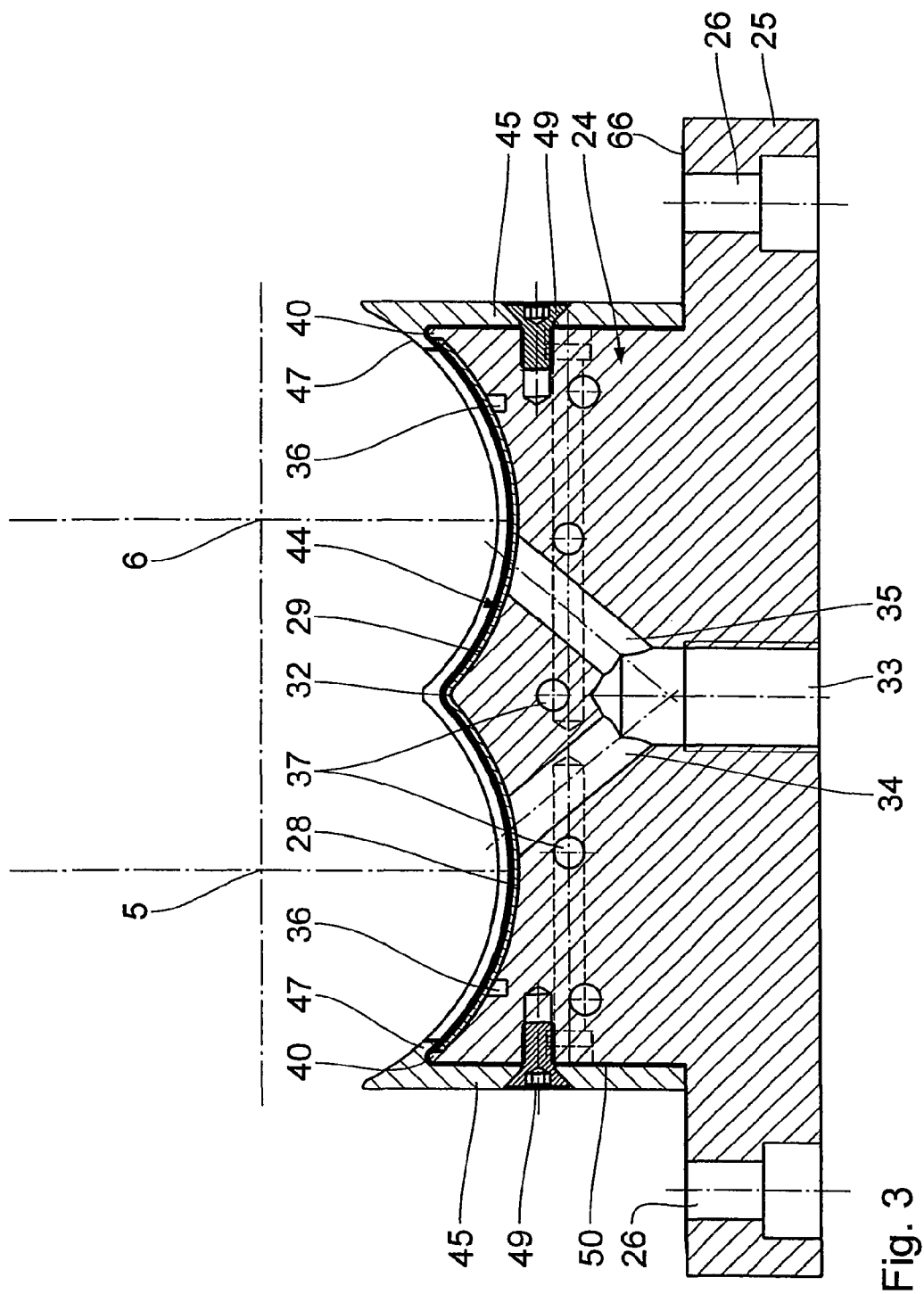
FIG. 3 shows a vacuum housing insert according to the invention in cross section.
Figure 4:
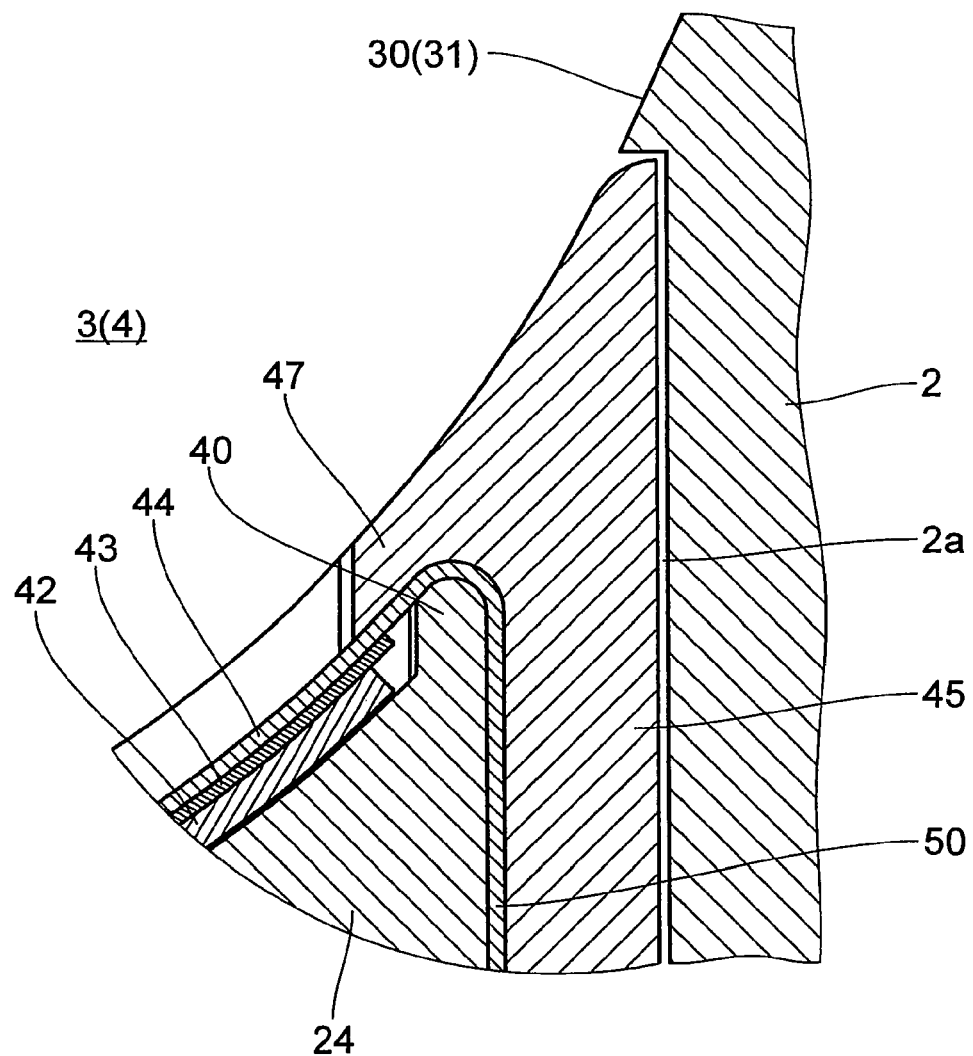
FIG. 4 shows a part view from FIG. 3 to an enlarged scale.
Figure 5:
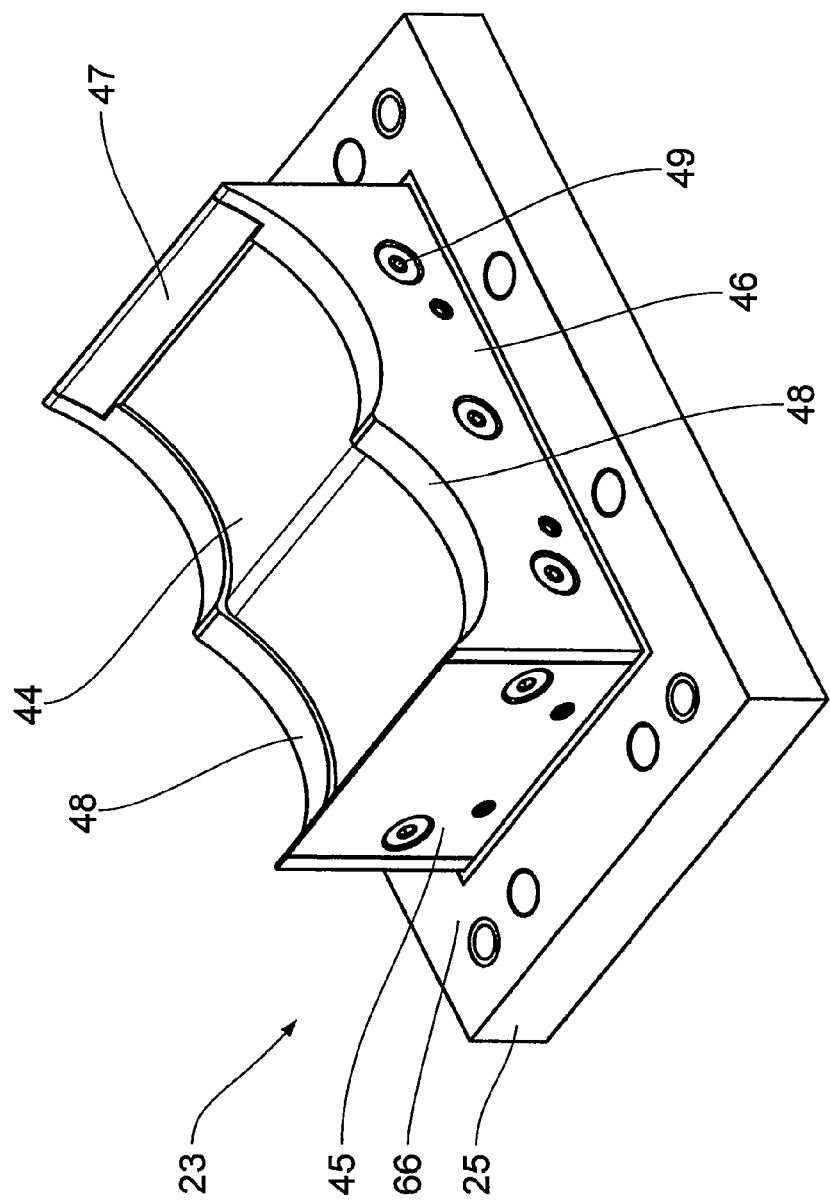
FIG. 5 shows a perspective view of a vacuum housing insert.
Figure 6:
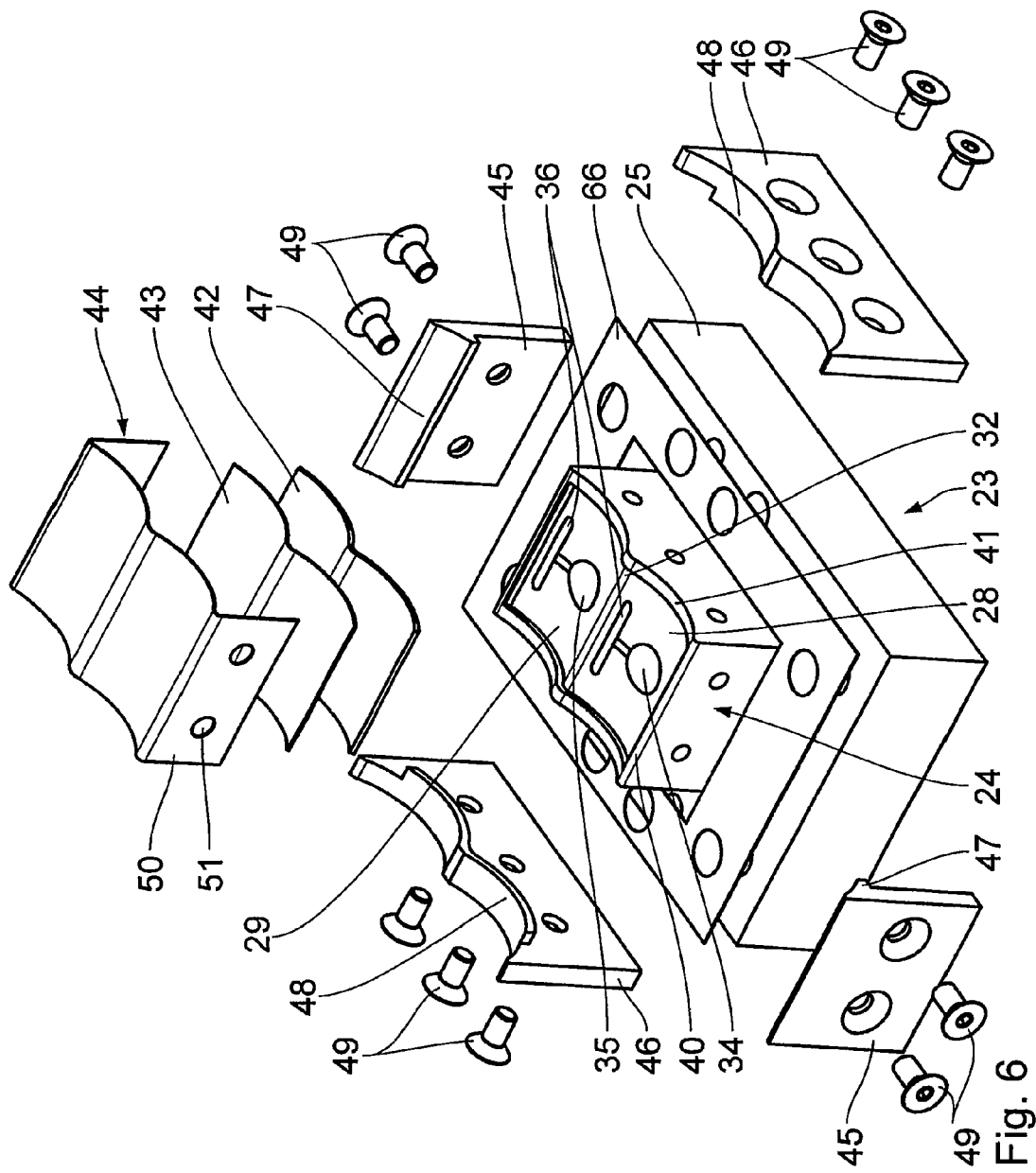
FIG. 6 shows a vacuum housing insert in an exploded view.
Figure 7:
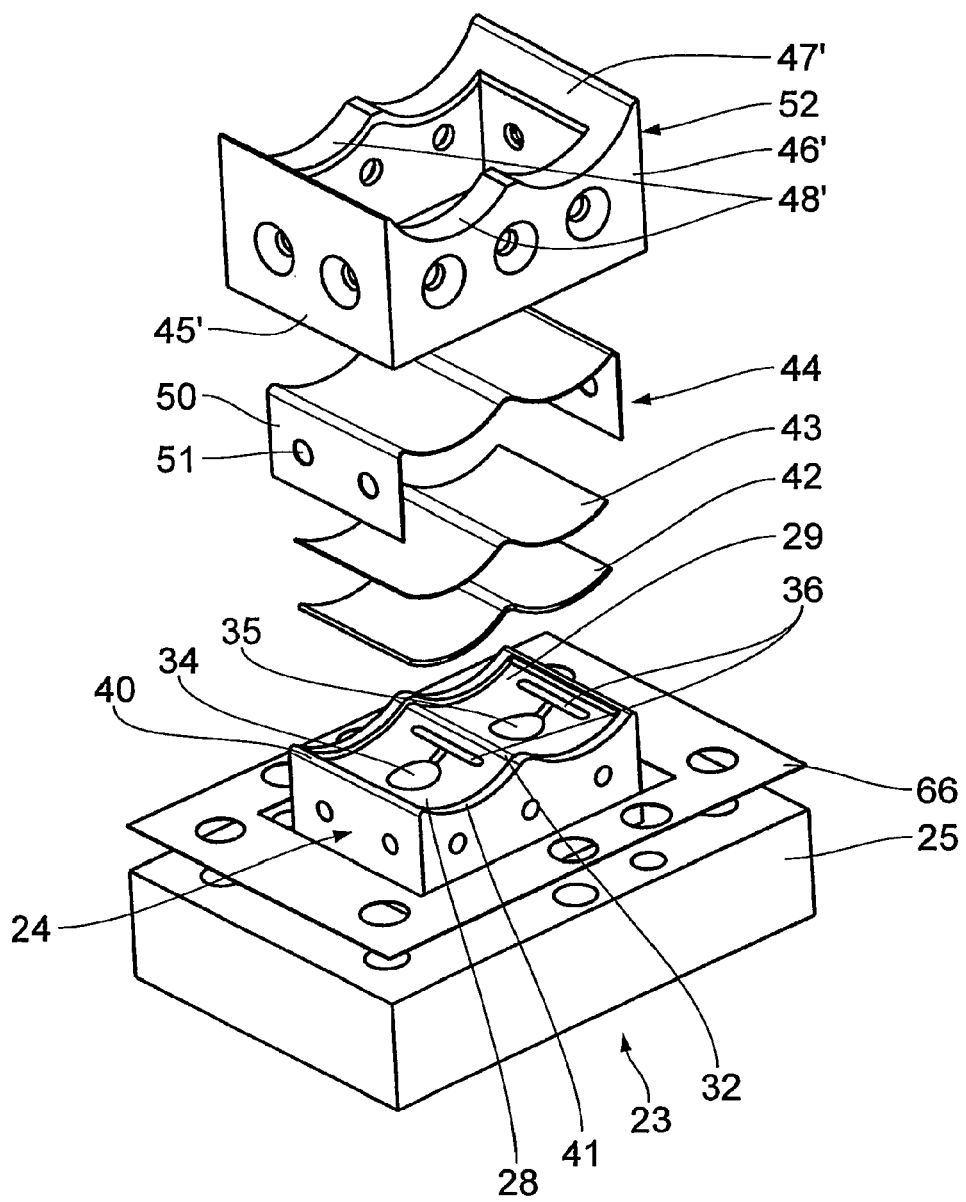
FIG. 7 shows a modified embodiment of a vacuum housing insert in an exploded view and FIG. 8 shows an extruder system with an upstream feed screw machine in vertical longitudinal section.

The drainage woven fabric 42, the support woven fabric 43 and the metal nonwoven 44 are fastened by strips 45, 46. The strips 45, 46 are approximately L-shaped, i.e. they have a transversely projecting clamping web 47 or 48. The strips 45 have a linear clamping web 47, which is associated with the edge webs 40. The strips 46 have doubly curved clamping webs 48, which correspond to the curved edge webs 41. As can be inferred from FIGS. 3 to 5 and the exploded views according to FIGS. 6 and 7, the metal nonwoven 44 is rigidly clamped in by means of the strips 45, 46 all around on the edge webs 40, 41 by means of the clamping webs 47, 48. The strips 45, 46 are fastened by means of screws 49 to the base body 24. The metal nonwoven 44 is rigidly clamped in here all around between the edge webs 40, 41 and the clamping webs 47, 48, pressing them together. Expediently, the metal nonwoven 44 also has additional clamping portions 50, which are bent downwardly over the linear edge webs 40 and are clamped between the strips 45 and the base body 24, the associated screws 49 also passing through holes 51 in these clamping portions 50, as can be inferred from the exploded views according to FIGS. 6 and 7.

Alternatively, the holding strips 45', 46' can also be connected to a holding frame 52, wherein they are either formed in one piece as a whole from the start, or are connected to one another by welding or the like. This can be inferred from the exploded view according to FIG. 7.

The vacuum channel 33 is connected by means of a vacuum line 53 to a vacuum source 54, for example a water ring pump. A vacuum control valve 55 is provided in the vacuum line 53. A pressure measurement apparatus 56 is also provided between the vacuum source 54 and the valve 55. A pressure flushing line 57, which is connected to a pressure gas source 58, also opens into the vacuum channel 33. A flushing valve 59 is fitted in this pressure flushing line 57. The pressure measurement apparatus 56 passes, by means of a signal line 60, measurement signals corresponding to the pressure measured in each case in the vacuum line 53 to a central controller 61. The vacuum control valve 55 is in turn activated by the central controller 61 by means of a vacuum control line 62. Furthermore, the flushing valve 59 is activated by the controller 61 by means of a line 63. Finally, the drive motor 64 of the metering device 22, the drive motor 19 of the extruder 1 and the motor 65 of the vacuum source 54 are activated by the controller 61. If the pressure in the vacuum line 53 falls below a predetermined value, this is an indication that the metal nonwoven 44 has exceeded a predetermined acceptable clogging value. The vacuum control valve 55 is then closed and the motors 19, 64, 65 are switched off. At the same time, the flushing valve 59 is opened so a pressure gas surge is provided by the pressure gas source 58 through the vacuum channel 33, which leads to a corresponding cleaning of the metal nonwoven 44.

If, on the other hand, the metal nonwoven 44 can no longer be adequately cleaned with a simple back-flush, it can be exchanged in a very simple manner, specifically by releasing the screws 27 and pulling out the vacuum housing insert 23 from the housing 2.

The screws 49 are then released, so the holding strips 45, 46 or the holding strips 45', 46' connected to a holding frame 52 can be removed. The metal nonwoven 44 is exchanged. The insert 23 is assembled again and inserted in the housing 2 of the extruder 1. A seal 66 may be arranged between the flange 25 of the vacuum housing insert 23 and the housing 2. As can be seen from the drawing, the clamping webs 47, 48 lie flush with the respective inner wall 30 or 31 of the bores 3, 4. This means that the metal non-woven 44 delimits a gap 67 relative to the screw webs 68 of the screws 7, 8.

Figure 8:
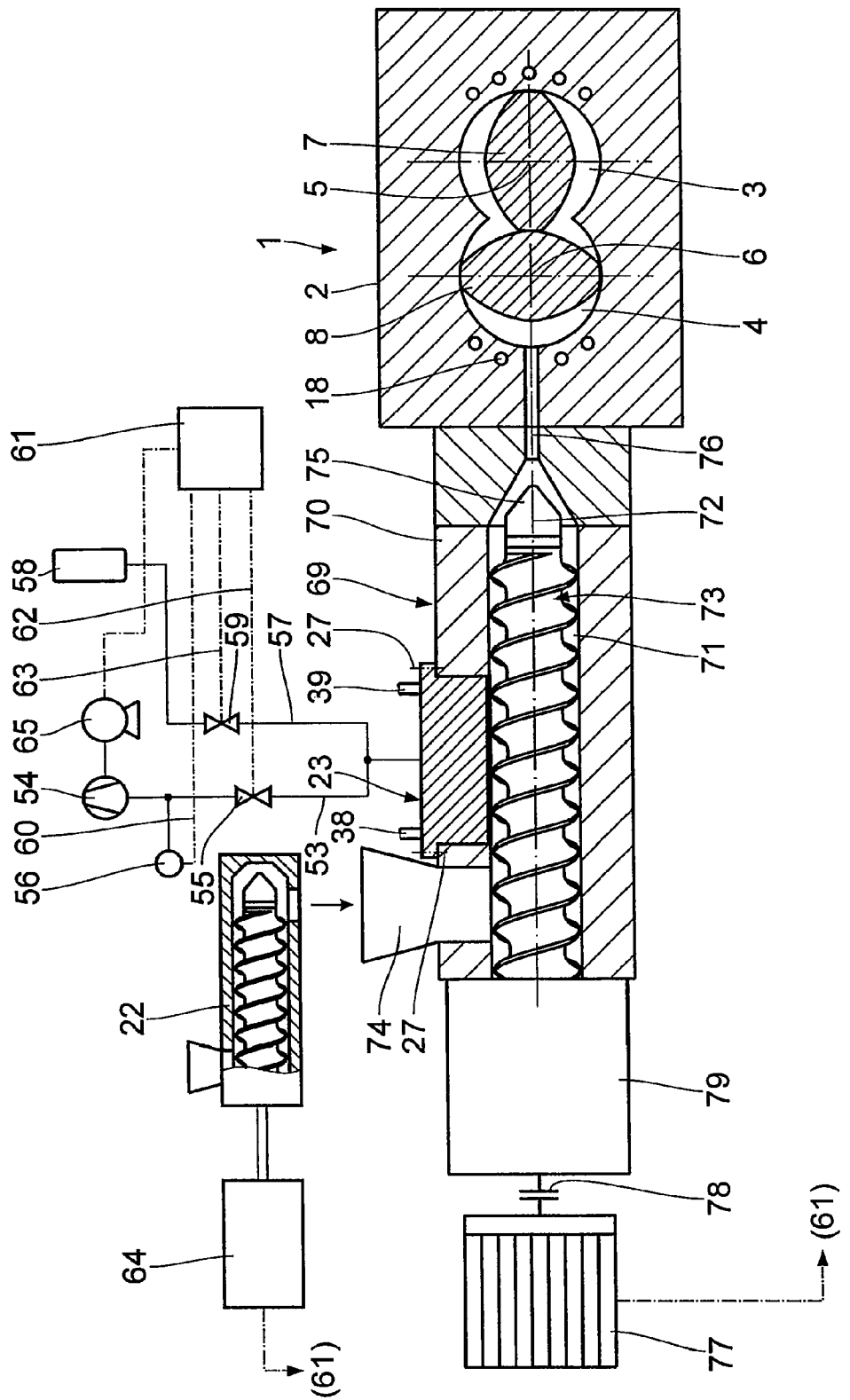

In one configuration of an extruder system according to FIG. 8, the bulk materials to be processed are not fed to the extruder 1 by means of the metering device 22 via a feed funnel, but by means of a feed screw machine 69. The latter has a housing 70, in which one or two bores 71 are formed, which in each case have axes 72. A screw 73 is arranged in each housing bore 71. A feed funnel 74 opens into the at least one bore 71 on one end, on the left in FIG. 8. The screw 73 is formed as a pure conveying screw and when two screws 73 are present these are formed as closely meshing conveying screws rotating in the same direction. A housing outlet 76 is formed in the region of the screw tip 75 and opens into the downstream extruder 1, into which the material to be processed into the extruder 1 is fed, in particular as a powdery material, such as polymers or additives.

The at least one screw 73 is driven by means of an electric motor 77, which is connected in terms of drive in the conventional manner by a clutch 78 to a reducing gearing 79. The screw 73 is in turn coupled in a conventional manner to the gearing 79, the gearing 79 also being formed as a distributor gearing when there are two screws 73. The metering device 22 is arranged above the feed funnel 74 and is constructed and operates as has already been described.

Arranged directly behind the feed funnel 74 in the housing 70 is a vacuum housing insert 23 which has already been described above in detail, and which is supplied with a partial vacuum and flushing air in the same manner as has already been described above for the extruder system.

The strongly air-containing bulk material is vented and compacted in the feed screw machine 69 by means of the vacuum housing insert 23, so it is already supplied to the extruder 1 in compacted form. Regarding the latter, no further venting needs to occur in the extruder 1 in this case.

To counteract mechanical damage to the metal nonwoven 44, for example by granulates or from friction, the metal nonwoven 44 can be reinforced by means of a sieving woven fabric. The metal woven fabric is attached on the side of the metal nonwoven 44 remote from the respective bore 3, 4.

What is claimed is:

1. A screw machine for treating at least partially powdery bulk material,
   with a housing (2; 70),
      which has at least one housing bore (3, 4; 71) with an inner wall (42, 43),
   with a feed opening (9; 74) for the bulk material arranged at one end of the housing (2; 70),
   with a respective screw (7, 8; 73) arranged in the at least one housing bore (3, 4; 71),
   with a metering device (22) arranged upstream of the feed opening (9; 74) for feeding the bulk material
   with a vacuum housing portion in the intake zone (14), which has a gas-permeable wall portion (24) delimiting the at least one housing bore (3, 4; 71), and
   with a drive (19; 77) for the at least one screw (7, 8; 74),
   wherein the vacuum housing portion is formed as a vacuum housing insert (23) releasably attached in the housing (2; 70), in which a metal nonwoven (44) is exchangeably held as a gas-permeable wall portion on a base body (24) and the metal nonwoven (44) is supported by means of a gas-permeable support body with respect to the base body (24),
   wherein a gas-permeable drainage body is arranged between the support body and the base body (24) and,
   wherein the base body (24) has at least one partially cylindrical support face (28, 29) adapted to the inner wall (30, 31) of the at least one bore (3, 4), against which support face the metal nonwoven (44) is supported and in that holding strips (45, 46, 45', 46') are releasably attached to the base body (24) and hold the metal nonwoven (44) in a clamping manner on the base body (24) and the base body (24) is provided with edge webs (40, 41) surrounding the at least one support face (28, 29), between which edge webs at least one of the support body and the drainage body are arranged.

2. A screw machine according to claim 1, wherein the metal nonwoven (44) has a filter fineness of 1 μm to 10 μm.

3. A screw machine according to claim 1, wherein the support body is formed as a support woven fabric (43).

4. A screw machine according to claim 3, wherein the support woven fabric (43) has a mesh width in the range of 100 μm to 400 μm.

5. A screw machine according to claim 1, wherein the drainage body is formed as a drainage woven fabric (42).

6. A screw machine according to claim 5, wherein the drainage woven fabric (42) has a mesh width in the range of 500 μm to 1000 μm.

7. A screw machine according to claim 1, wherein the holding strips (45, 46, 45', 46') have clamping webs (47, 48), which hold the metal nonwoven (44) in a clamping manner against the base body (24).

8. A screw machine according to claim 1, wherein the holding strips (45, 46, 45', 46') are arranged flush with the inner wall (30, 31) of the at least one bore (3, 4).

9. A screw machine according to claim 1, wherein the metal nonwoven (44) is partially held in a clamping manner between the base body (24) and at least one holding strip (45, 45').

10. A screw machine according to claim 1, wherein the holding strips (45', 46') are formed as a holding frame (52).

11. A screw machine according to claim 1, wherein the metal nonwoven (44) is provided with a metal woven fabric as a reinforcement.

* * * * *